UNITED STATES PATENT OFFICE.

GERHARD NICOLAAS VIS, OF PARIS, FRANCE.

PROCESS FOR REGENERATING OXID-OF-NICKEL CATALYZERS EMPLOYED IN THE HYDROGENATION OF FATTY BODIES.

1,326,122.    Specification of Letters Patent.    Patented Dec. 23, 1919.

No Drawing.    Application filed November 21, 1917. Serial No. 203,190.

*To all whom it may concern:*

Be it known that I, GERHARD NICOLAAS VIS, of 10 Rue de Vienne, Paris, France, chemist, have invented a new and useful Improvement in Processes for Regenerating Oxid-of-Nickel Catalyzers Employed in the Hydrogenation of Fatty Bodies, which improvement is fully set forth in the following specification.

It is known that oxid of nickel can be employed as a catalyzer for the solidification of oils and in the form of a suboxid of nickel may be repeatedly used, but like all other catalyzers loses its activity after repeated use.

This invention has for its object to recover the nickel from a spent inactive catalyzer in such a state that it forms a fresh active catalyzer. The recovery of catalyzers is very important as nickel is expensive.

The first operation required is, after having allowed it to deposit, to separate the spent catalyzer, by physical means such as filtration, centrifugal action, or the like, from the grease with which it is accompanied. This product is then, according to this invention, first freed from grease by means of solvents, such as petrol, benzin or chlorinated solvents, such as ethylene trichlorid, for example. The residue freed from the adherent solvent is a light black powder, which, besides suboxid of nickel, probably contains combinations of nickel with fatty acids. However this may be, even after treating the product for several days with solvents it is impossible to completely free it from grease.

The most simple means for freeing it from the adherent organic products is to heat the nickeliferous residues to a high temperature in the presence of air.

By heating the mass to redness and keeping it continuously stirred, the organic products adhering to the catalyzer freed from grease are decomposed and act as reducing agents. By then allowing the inlet of air the whole mass becomes incandescent. If at this moment or a short time afterward, that is to say, before complete oxidation of the nickel, the admission of air is stopped, there will be obtained, after cooling, a fine black powder consisting of one or more oxids of nickel which after being freed from those inorganic products which prevent catalysis may be employed as a catalyzer for the hydrogenation of oils; the means for freeing the catalyzer from such inorganic products are hereinafter indicated. The powder when cooled is no longer pyrophoric and is free from organic products.

Cotton seed oil treated at a temperature of from 255° to 260° C. with 1% of this product has at the end of two hours treatment with hydrogen, a melting point of 32° C. A product which is exposed somewhat longer to the air when the mass is incandescent but in which the oxidation is not pushed so far as to obtain nickel oxid (NiO) has given the following results on adding 1% of the product thus obtained to cotton seed oil and by causing a current of hydrogen to pass through the oil at a temperature of from 255° to 260° C.:

Melting point after passing hydrogen through for 1 hour 28.2° C.

Melting point after passing hydrogen through for 2 hours 34.6° C.

Melting point after passing hydrogen through for 3 hours 38° C.

If in place of stopping the admission of air as above described, the calcination and oxidation treatment is pushed to the limit while keeping the material well stirred, and by blowing in air in excess from the commencement, the reduction of the suboxid of nickel to metallic nickel can be completely avoided in spite of the presence of the reducing gases derived from the organic products present. Thus even slight agglomeration of the nickel oxid by the particles of nickel which may be formed intermediately can be avoided and gray nickel oxid (NiO) is produced which may be employed as a catalyzer. It may be noted, however, that the activity of this latter caltalyzer if employed without other treatment is imperfect. In effect several hours are required to solidify a cotton seed oil to a product having a melting point of about 40° C. in presence of such a catalyzer.

In order to obtain a fresh catalyzer endowed with great activity such gray oxids of nickel having a moderate catalytic power is according to this invention subsequently transformed into a catalyzing product which is particularly active for fatty bodies.

It is known that the activity of gray nickel oxid (NiO) can be increased either by repeated employment as a catalyzer for the hydrogenation of oils, or by suspending it in several times its weight of oil heated to about 300° C. and by subjecting it at the same time to the action of hydrogen. With, for example, 1% of such active catalyzer it is possible to solidify cotton seed oil in 1½ hours and obtain a product having the melting point of 40 to 45° C.

The transformation of the oxids of nickel and in particular gray nickel oxid (NiO) obtained as above described or made freshly into suboxid of nickel, and if desired into an ultra-active catalyzer for the hydrogenation of fatty bodies is effected according to this invention by partially reducing these oxids in the dry by hydrogen or other reducing products. The degree of reduction may vary largely; however, the reduction should not be carried far enough to obtain pyrophoric products. If, for example, 30 to 70% of the oxygen is removed by passing hydrogen over nickel oxid at a temperature of from 290 to 300° C., (stirring from time to time when small quantities are treated or continuously when large quantities are treated) catalyzers are obtained which possess surprising powers. It is of course understood that the figures 30 to 70 are only given by way of example, thus active catalyzers are obtained by the removal of less oxygen than 30% or more oxygen than 70%.

Example I: An oxid of nickel recovered by removing grease by means of solvents from a spent and inactive catalyzer is heated to incandescence in the presence of an excess of air until gray nickel oxid (NiO) is obtained; this is then reduced in a current of hydrogen at 295° C. until 48.2% of the oxygen originally present in the nickel oxid, is removed; the following results may be obtained by employing this product for the hydrogenation of cotton seed oil at a temperature of from 255 to 260° C.

| Percentage by weight of the catalyzer added to the oil. | Duration of the operation. | Fusing point of the solidified oil obtained. |
|---|---|---|
| 0.2% | 1¼ hours | 34.2° C. |
| 1.0% | 1¼ " | 38.4° C. |
| 2.5% | 1¼ " | 49.5° C. |
| 0.2% | 2½ " | 41.2° C. |
| 1.0% | 2½ " | 49.5° C. |
| 2.5% | 2½ " | 55.5° C. |

Example II: An oxid of nickel recovered by treating a spent and inactive catalyzer with ethylene trichlorid and then heating to incandescence in the presence of an excess of air until gray nickel oxid (NiO) is obtained, and, after cooling, washing with hot water and drying at 200° C., is reduced by a current of hydrogen at a temperature of 295° C. until 69.2% of the oxygen originally present in the nickel oxid is removed. This suboxid of nickel gives the following results when employed for the hydrogenation of cotton seed oil at from 255 to 260° C.:

| Percentage by weight of the catalyzer added to the oil. | Duration of the operation. | Fusing point of the solidified oil obtained. |
|---|---|---|
| 0.2% | 1 hour | 29.6° C. |
| 1.0% | 1 " | 36.8° C. |
| 0.2% | 2 " | 35.0° C. |
| 1.0% | 2 " | 44.6° C. |
| 0.2% | 3 " | 37.8° C. |
| 1.0% | 3 " | 48.8° C. |

In the example the nickel oxid (NiO) recovered by the removal of the grease by means of chlorinated solvents is washed with water. This is due to the fact that chlorinated solvents are only moderately stable, and it may happen that nickel oxid thus treated may for one reason or another contain traces of chlorin as is the case in the above example. These traces of chlorin are, as is known, very injurious when fatty bodies are hydrogenated by catalyzers. In this case and in that of recovered oxid or suboxid of nickel the product will contain chlorinated, sulfated or other products soluble in water, and washing in water (until the complete disappearance of these products) is necessary. The material is then dried, for example at 200° C.

The manner of operating above described has numerous advantages and leads in a very simple manner to the recovery of oxid or suboxid of nickel catalyzers of superior quality. These advantages may be summarized as follows:

It is possible to employ chlorinated organic solvents for removing grease from the spent catalyzers thus securing absolute immunity from fire.

The product obtained by removing the grease either by the aid of ordinary solvents or of chlorinated organic solvents allows, after more or less prolonged calcination and oxidation in air and washing in water, oxids or suboxids of nickel catalyzers to be obtained which increase in activity with repeated employment or by merely partially reducing in the dry.

The catalyzers thus obtained are, not being pyrophoric, easy to dry, and after having been employed to solidify fatty bodies, separate particularly well.

It will be understood that the presence of mineral products, if they do not prevent hydrogenation, are not in any way harmful in the various processes above described of recovering oxid and suboxid of nickel.

Claims:

1. The process of regenerating nickel catalyzers employed for the hydrogenation of fatty bodies, consisting in treating the spent catalyzer with a solvent to remove fatty bodies, heating the residue in the presence of excess of air to produce gray nickel oxid NiO, washing the same with water to remove any soluble inorganic impurities, drying the oxid, and then subjecting the purified oxid to a reducing agent to remove a portion of the oxygen therefrom.

2. The process of regenerating nickel catalyzers employed for hydrogenation of fatty bodies, consisting in treating the spent catalyzer with a chlorinated organic solvent to remove fatty bodies, heating the residue in the presence of excess of air to produce gray nickel oxid NiO, washing the same in water to remove any soluble inorganic impurities, drying the oxid at about 200° C., and then subjecting the purified oxid to hydrogen at about 295° C. to partially reduce the same.

3. The process of regenerating nickel catalyzers employed for the hydrogenation of fatty bodies, consisting in treating the spent catalyzers with a solvent to remove fatty bodies, calcining the residue thereby destroying any remaining organic matter and washing the product with water to remove any soluble inorganic impurities, and then drying the washed product.

In testimony whereof I have signed this specification in the presence of two subscribing witnesses.

GERHARD NICOLAAS VIS.

Witnesses:
CHRS. P. PRESSLY,
GASTON DE MESTRAL.